United States Patent [19]

Bergstrom

[11] Patent Number: 5,059,029
[45] Date of Patent: Oct. 22, 1991

[54] RADIATION-HARDENED RLG READOUT

[75] Inventor: James W. Bergstrom, New Brighton, Minn.

[73] Assignee: Honeywell Inc., Minneapolis, Minn.

[21] Appl. No.: 260,089

[22] Filed: Oct. 20, 1988

[51] Int. Cl.$^5$ .............................................. G01C 19/64
[52] U.S. Cl. .................................................. 356/350
[58] Field of Search .......................... 356/350; 372/94

[56] References Cited

U.S. PATENT DOCUMENTS

| 235,199 | 12/1880 | Bell ................................ 250/211 R |
| 4,582,429 | 4/1986 | Callaghan .......................... 356/350 |
| 4,677,641 | 6/1987 | Podgorski .......................... 356/350 |
| 4,712,917 | 12/1987 | Bergstrom et al. ................. 356/350 |

OTHER PUBLICATIONS

"DNA Test, Evaluation, and Hardness Assurance Programs" by J. Colwell, J. Harrity, A. Kalma, B. Passenheim, and D. Snowden, for Jun./Jul. and Aug./Sep., 1978.

Primary Examiner—Samuel Turner
Attorney, Agent, or Firm—Robert A. Pajak

[57] ABSTRACT

In the present invention, a prismatic structure receives the small portions of the counter-propagating waves which are transmitted through a partially transmitting mirror at one of the corners of the gyro. Exiting from the prismatic structure is a light beam which is redirected by a concave mirror which serves to cause the light beam to travel along a first light path and also cause the impinging light beams to be focused at a selected point at which the beam size thereat is less than the original beam size impinging upon the concave mirror. Further, the concave mirror is positioned such that the light path reflected from the concave mirror passes through the prismatic structure so as to minimize the readout assembly bulk optic size, thus being more compact.

7 Claims, 3 Drawing Sheets

RADIATION-HARDENED RLG READOUT

BACKGROUND OF THE INVENTION

The present invention relates to a ring laser angular rate sensor, usually referred to as a ring laser gyroscope. More particularly it relates to a readout apparatus for such a ring laser gyroscope.

A ring laser gyro is a laser apparatus having a ring type resonant cavity, or simply a ring resonator. The ring resonator is commonly constructed of a block having a plurality of interconnecting tunnels in the shape of a polygonal path such as, for example, a triangular or rectangular path. The laser beam is directed around the ring path by suitable mirrors appropriately positioned at the intersections of pairs of interconnecting tunnels. In ring laser gyros there are commonly two laser beams traveling in opposite directions relative to each other around the polygonal ring path. The positioning of the mirrors in the corners of the polygonal ring path direct the laser beams through the tunnels of the resonant cavity. At one of the corners, the mirror is partially transmissive whereby major portions of the counter-propagating beams are reflected, while small portions of each of the counter-propagating beams are transmitted through the mirror into a readout assembly. Some examples of ring laser gyros are shown and described in U.S. Pat. Nos. 3,373,650 and 3,467,472 issued to Killpatrick, and U.S. Pat. No. 3,390,606 issued to Podgorski, these being incorporated herein by reference.

The aforementioned readout assembly generally comprises a prismatic structure for combining those small portions of each of the counter-propagating beams to produce either an interference fringe pattern comprised of light intensity bands with directional movement, or alternatively a light intensity spot which varies in intensity between high and low values at a rate proportional to the frequency difference between the counter-propagating beams. The readout assembly may be either "block mounted" or displaced from the block. U.S. Pat. No. 3,373,650 illustrates a readout assembly which is displaced from the gyro block. In U.S. Pat. No. 3,373,650, the readout assembly is comprised of a corner prism which combines the small portions of the counter-propagating beams which are transmitted through the partially transmissive mirror, and recombines them to form an interference fringe pattern.

U.S. Pat. No. 4,582,429, issued to Steven P. Callaghan, U.S. Pat. No. 4,677,641 issued to Theodore J. Podgorski, and U.S. Pat. No. 4,712,917 issued to Bergstrom et al. all show block mounted readout assemblies which are all solid structures comprised of one or more prism elements. These prism elements combine those portions of the counter-propagating laser beams, transmitted through the partially transmissive mirror, to produce an interference fringe pattern or light intensity spot. These patents are also incorporated herein by reference.

The aforementioned Callaghan and Bergstrom et al. Patent disclose prismatic structures which combine the small portions of the counter-propagating laser beams to produce an interference light spot. The Podgorski Patent shows a unitary solid structure prism for producing an interference fringe pattern; and the Callaghan and Bergstrom et al. Patents show a solid structure prism comprised of a pair of prisms mounted to a mirror assembly substrate. All of the just referred to readout assemblies are all intended to be directly mounted to the ring laser gyro block.

Associated with the readout assemblies of the prior art is at least one photodetector which is generally responsive to either the interference fringe pattern or the interference light spot.

Readout assemblies known in the prior art for ring laser gyros are particularly susceptible to radiation-induced noise, i.e., unwanted signal or effect generally caused by nuclear radiation, which may result in poor sensor performance due to rotation rate information errors. The magnitude of the sensitivity to radiation-induced noise is thought to be directly related to the size of the photodetectors. The size of the detectors being determined by the size of the output light spot or interference fringe pattern.

BRIEF DESCRIPTION OF THE INVENTION

The object of the present invention is to produce a small light intensity spot or light interference fringe pattern so as to lower the required size of the photodetectors which respond to such patterns, and at the same time keep package size to a minimum.

In the present invention, an optical means receives the small portions of the counter-propagating waves which are transmitted through one of the reflecting means at one of the corners of the gyro. Exiting from the optical means is a light beam which is redirected by a concave mirror which serves to cause the light beam to travel along a first light path and also cause the impinging light beams to be focused at a selected point at which the beam size thereat is less than the original beam size impinging upon the concave mirror. Further, the concave mirror is positioned such that the light path reflected from the concave mirror passes through the first optical means so as to minimize the readout assembly bulk optic size, thus being more compact.

DETAILED DESCRIPTION OF THE DRAWINGS

DETAILED DESCRIPTION OF THE INVENTION

Figure 1:
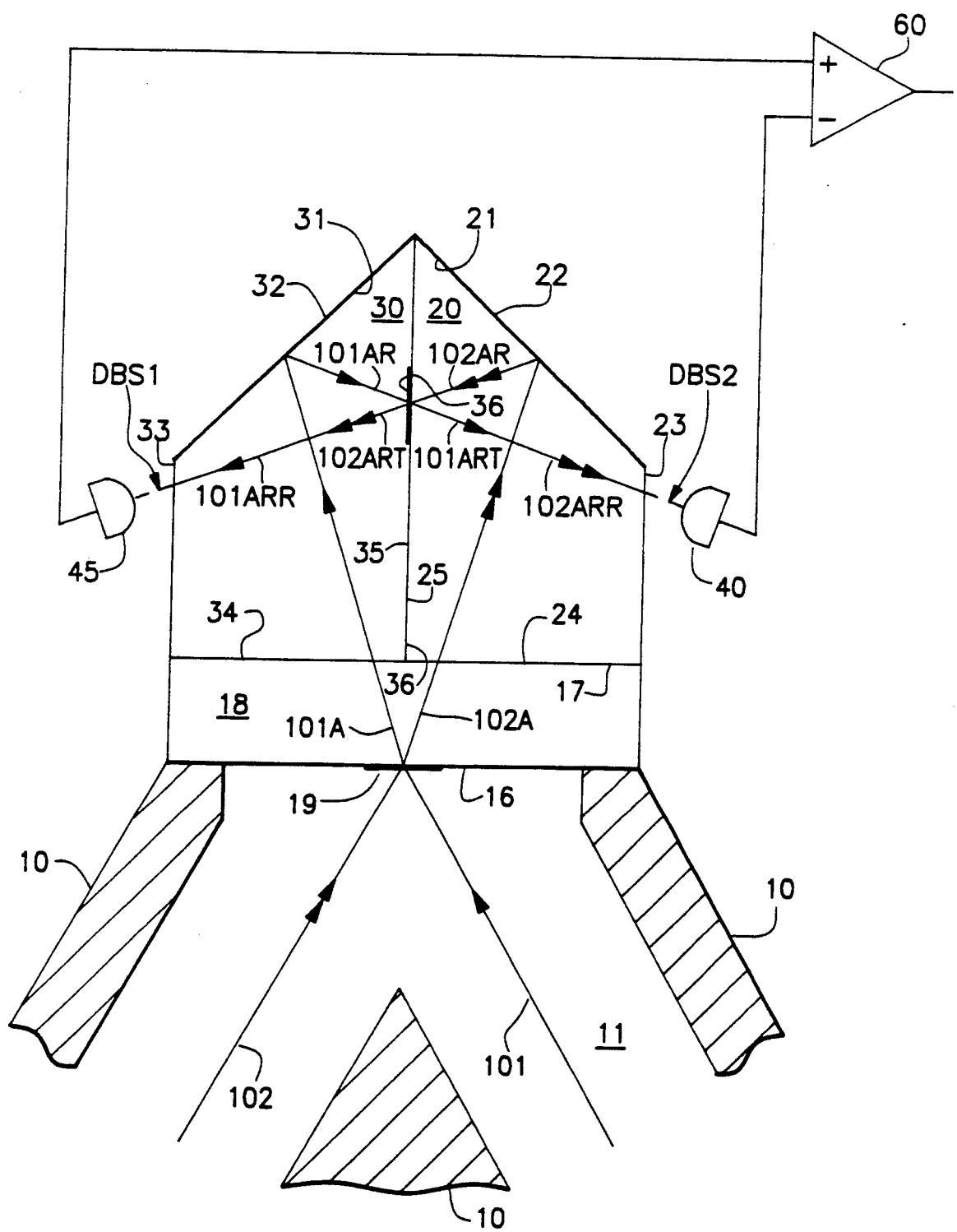
FIG. 1 illustrates a readout assembly of the prior art.

Referring now to the drawings in more detail, there is shown in FIG. 1 a schematic diagram similar to that shown in U.S. Pat. No. 4,582,429. Particularly, FIG. 1 represents a readout corner of a ring laser gyro of the triangular type as shown in the aforementioned U.S. Pat. No. 3,390,606.

Illustrated in FIG. 1, a thermally and mechanically stable block 10 has formed therein a resonant cavity 11 (partially shown). Cavity 11 is sealed at each of the corners by an output substrate 18 which includes a mirror means 19 generally comprised of a plurality of alternating layers of two different dielectric materials, e.g., titanium oxide, and silicon dioxide.

For triangular ring laser gyros, there are three such corners with suitable substrates 18 sealing each of the three corners. Cavity 11 is filled with a suitable lasing gas which is excited by an appropriate voltage in accordance with well established principles for lasers. By an appropriate electrical exciting means, first and second laser beams 101 and 102, respectively, are established to travel in opposite directions about the closed-loop or ring path of the assembly in a well known manner.

As is particularly illustrated in FIG. 1, substrate 18 includes a first surface 16 thereof having a partially transmissive mirror coating 19 thereon, whereby a portion of each of the two impinging laser beams 101 and 102 are transmitted through the surface 16 of substrate 18; and a larger portion of each impinging beam is reflected back into resonant cavity 11. Those portions of beam 101 and 102 which pass through the mirror 19 and substrate 18 are identified as beams 101A and 102A, respectively.

Coupled to substrate 18 are a pair of prisms 20 and 30 which are strategically located to direct the light paths followed by beams 101A and 102A and combine portions of these beams 101A and 102A so as to exit from the prismatic structure for subsequent photodetection. The prismatic structure illustrated produces light beams DBS1 and DBS2 being characteristic of a function of beams 101 and 102. The exit beams DBS1 and DBS2 produced by the prismatic structure of FIG. 1 are of the variety for creating an interference light spot which varies in intensity as opposed to the variety which creates an interference fringe pattern.

The following is a very brief description of the prismatic readout structure, shown in FIG. 1 and similar to that taught in U.S. Pat. No. 4,582,429. The prismatic readout structure includes prism elements 20 and 30. Prism 20 is provided with first and third surfaces 23 and 25 in parallel, a second surface 24 perpendicular to both surfaces 25 and 23, and a fourth surface 21 at a predetermined angle with respect to third surface 25. The fourth surface 21 includes either a totally reflective or partially transmissive optical coating 22 thereon. In FIG. 1, coating 22 is illustrated to provide total reflection. In the exemplary embodiment, fourth surface 21 of prism 20 may be at an angle approximately 45° with respect to third surface 25.

Second prism 30 is substantially identical in construction as prism 20. Prism 30 includes first and third surfaces 33 and 35 which are essentially parallel, second surface 34 which is mutually perpendicular to surfaces 35 and 33, and a fourth surface 31 at a predetermined angle with respect to surface 35. Fourth surface 31 includes a reflective optical coating 32, thereon. In the exemplary embodiment, fourth surface 31 of prism 30 may also be at an angle of approximately 45° with respect to third surface 35.

The positioning of prisms 20 and 30 is such that surfaces 24 and 34 are co-planar and positioned in contiguous juxtaposition with respect to surface 17 of substrate 18. Further, surfaces 25 and 35 are fixed together by suitable means, e.g., optical contact bonding or an adhesive. Further, an optical coating is provided at an appropriate location on either surface 25 or 35 to provide a beam splitter 36.

The path of the waves of the prismatic structure of FIG. 1 will now be described. Laser beam 101 impinges upon wave reflecting surface 16 and a portion of beam 101, namely 101A is refracted by substrate 18 and transmitted through substrate 18 and block 30, and impinges upon wave reflecting means 32 on the surface 31 which thereby produces reflected beam 101AR. Beam 101AR is directed to impinge upon beam splitter 36 at the surface 35 which splits beam 101AR into a transmitted portion 101ART and a reflected portion 101ARR. In turn, beam 101ARR travels through block 30 an emerges from surface 33 toward detector means 45 at a first spatial location; and beam 101ART emerges from surface 23 toward detector 40.

In a similar manner, laser beam 102 impinges upon wave reflecting surface 16, and a portion of beam 102, namely 102A, is refracted by substrate 18 and transmitted through substrate 18 and block 20, and impinges upon wave reflecting means 22 at surface 21 which thereby produces reflected beam 102AR. Beam 102AR is directed to impinge upon beam splitter 36 which splits beam 102AR into a transmitted portion 102ART and reflected portion 102ARR. In turn, beam 102ARR travels through block 20 and emerges from surface 23 toward detector means 40 at a second spatial location; and beam 102ART emerges from surface 33 toward detector 45.

The construction of prisms 20 and 30, and particularly the angular relationships between all of their surfaces and their relationship to the surfaces of substrate 18 are such to cause the reflected beams 101AR and 102AR to (i) impinge upon the same point of beam splitter 36 from opposite sides thereof, and (ii) be at the same angle relative to the interface of surfaces 25 and 35. Generally it is preferred that all beams traverse substantially equal pathlengths. Thus symmetrical construction of blocks 20 and 30 is generally desirable.

The relative angle between surfaces 25 and 35 and both surfaces 21 and 31 is critical. Appropriately arranged, beams 101ARR and 102ART coexist and are coaxial, thereby producing a combined double beam signal DBS1 having an intensity related to the combined intensity of beams 101ARR and 102ART. The combined beams are therefore a function of the phase relationship between beams 101 and 102. Similarly, beams 101ART and 102ARR coexist and are coaxial and produce a combined double beam signal DBS2 having an intensity related to the combined intensity of beams 101ART and 102ARR which are also a function of the phase relationship between beams 101 and 102.

Detectors 40 and 45 are each separately responsive to the double beam signals which has an intensity which varies as a function of the phase difference between beams 101 and 102. In the above circumstances, i.e., coaxial beams, detectors 40 and 45 have output signals which are directly related to the intensity of a light "spot" which varies in intensity due to the interference between the two combined beams, namely the double beam signal. The detector output signals therefore provide sensor rotation information in a well known manner.

If beam splitter 36 is constructed by way of a low absorption or a low loss optical coating such as a dielectric material, the reflected and transmitted beams of an impinging beam will be substantially complementary or 180° out of phase with each other. Accordingly, the first and second double beam signals, DBS1 and DBS2, will also be complementary or 180° out of phase with each other. The detector output signal may be differentially compared by amplifier 60 to provide rotation rate information.

Figure 2:
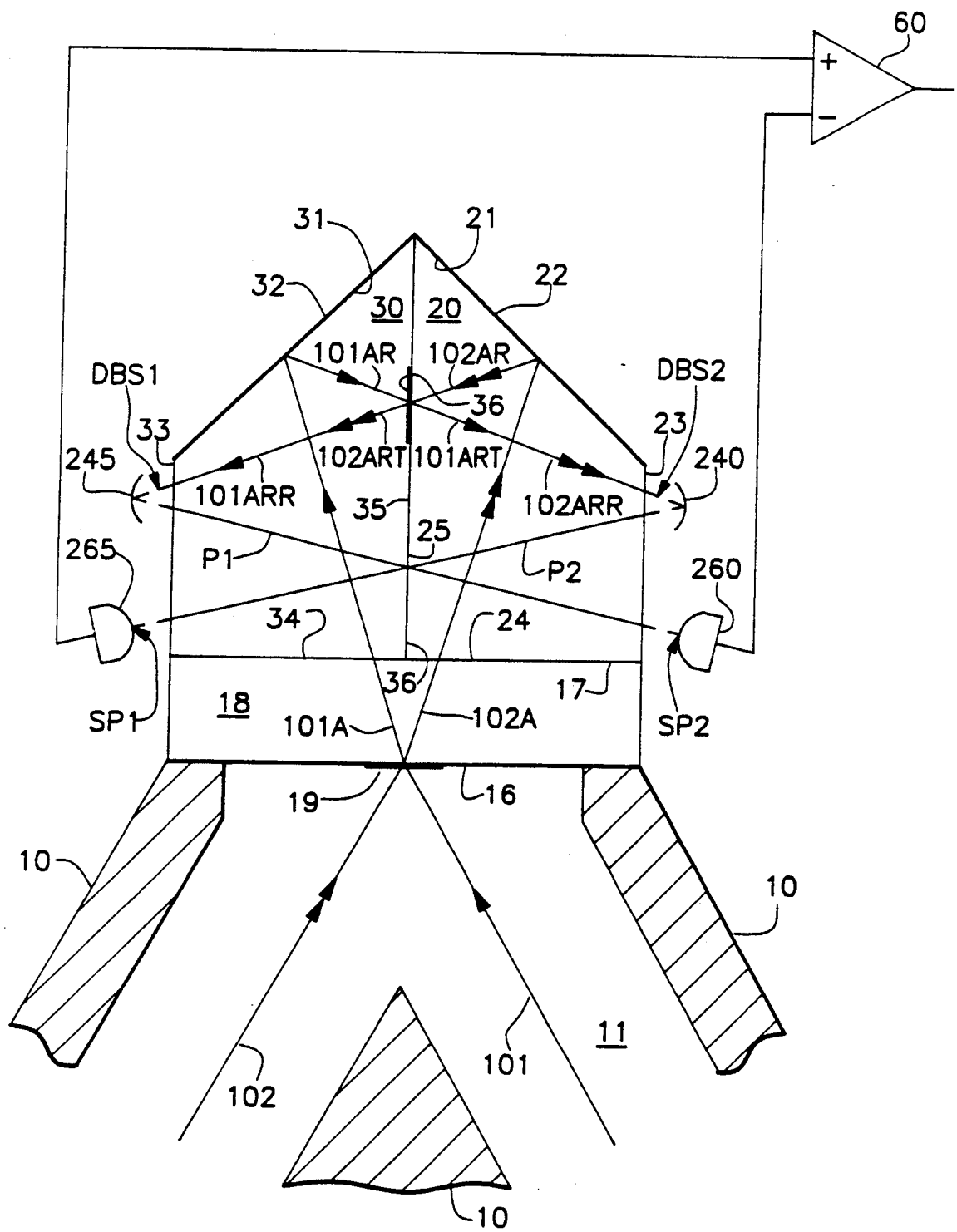
FIG. 2 illustrates a readout assembly in accordance with the present invention.

Referring now to FIG. 2, there is shown a schematic diagram of a readout assembly in accordance with the present invention. In FIG. 2, the same numeral designations as those shown FIG. 1 for like functioning elements and paths have been retained.

In FIG. 2, detectors 40 and 45 shown in FIG. 1 have been replaced by concave mirrors 240 and 245, respectively.

Concave mirror 245 receives the coexisting beams DBS1 having a first beam spot size, and directs beam DBS1 to traverse along a light path identified as P1 from concave mirror 245 and which successively passes through prisms 30 and 20 toward photodetector 260. Concave mirror 245 focuses and condenses all the light impinging thereon at a first selected point identified as SP1, substantially near the focal point of concave mirror 245. Similarly, concave mirror 240 receives the coexisting beams DBS2 having a first beam spot size, and directs beam DBS2 to traverse along a light path identified as P2 from concave mirror 240 and which successively passes through prisms 20 and 30 toward photodetector 265. Concave mirror 240 focuses and condenses all the light impinging thereon at at a second selected point identified as SP2, substantially near the focal point of concave mirror 265. Thus, each of the concave mirrors 240 and 245 are positioned to receive their respective impinging light beams, and cause these beams to travel along a light path which traverses through the solid prism structure, and causes their respective light beam to be reduced in beam size, especially near the focal point of the concave mirrors.

Detectors 260 and 265 are preferably positioned at points SP1 and SP2, respectively, which should be near the focal points of the concave mirrors 245 and 240, respectively. Detectors 260 and 265 receive beams DBS1 and DBS2 reflected from concave mirrors 245 and 240, respectively. Since the beam spot size near the focal point is substantially reduced compared with the beam impinging on the concave mirror, the size of the photodetectors 260 and 265 can be substantially reduced over that of the prior art. That is the size of the photodetectors need only be as large as the beam spot size near the focal point.

Generally, the position of the detectors is chosen such that the beam size impinging on the detectors is sufficiently small, but does not saturate the detector nor produce unwanted retroreflection back into the ring path formed in carity 11.

Figure 3:
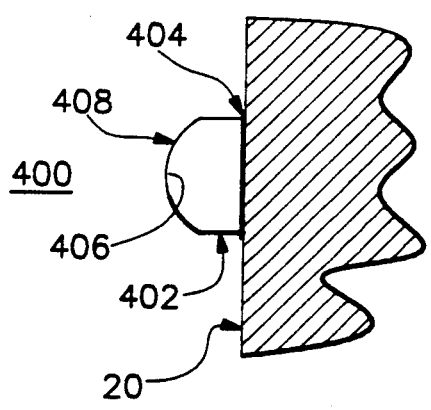
FIG. 3 shows a concave mirror structure.
Figure 4:
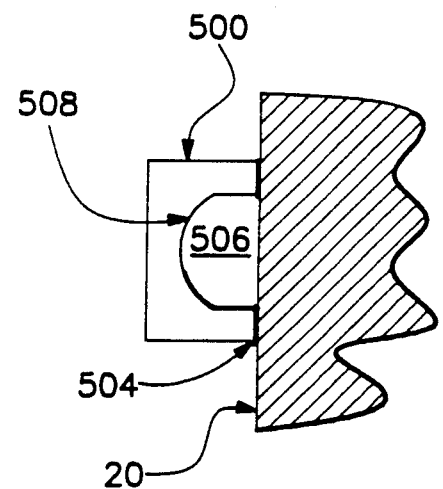
FIG. 4 shows another concave mirror structure.

FIGS. 3 and 4 illustrate two techniques for fixing a concave mirror to the solid prismatic structure illustrated in FIG. 2. FIG. 3 depicts a solid mirror structure 400 in which a mirror substrate 402 is attached to the prism 20 with a transparent adhesive 404 having preferably an index of refraction which matches the substrate 402. The substrate includes a convex outer surface 406 on which is deposited a suitable mirror coating 408. FIG. 4 is an example of a hollow structure in which a substrate 500 in includes a concave shaped cavity 502. The concave cavity 502 is coated with a mirror coating 508. The hollow structure is fixed to the prism 20 by an adhesive 504. The hollow structure does not require a transparent substrate 500.

There are of course a variety of concave mirror structures which can be positioned relative to the prism to serve its intended function in accordance with the spirit and scope of the present invention. These mirror structures may be fixed to the prisms by a variety of techniques including optical contact.

It should be understood by those skilled in the art that in accordance with generally well known optics, that the photodetectors may be positioned both in front of and in back of the focal point. In this situation the light beams would be reduced in size but not the smallest size. In the present invention, it is important in the present invention that the photodetector be placed at a strategic location so that beams DBS1 and DBS2 have sufficient energy at the photodetector location, and the photodetectors be sufficiently large enough to perceive the variations in intensity to produce rotation rate output information.

It should be understood therefore, that various changes and modifications may be made to the invention shown in the accompanying Figures and described herein as will be apparent to those skilled in the art, and are within the true spirit and scope of the present invention. It should be particularly noted than an interference fringe pattern may also be reduced in size in a manner in accordance with the principles of the present invention.

The embodiments of the invention in which an exclusive property or privilege is claimed are defined as follows:

1. A readout apparatus for a ring laser gyro wherein a laser gain medium in combination with a plurality of wave reflecting means are positioned to form an optical ring path with provides at least two counter-propagating waves traveling about said ring path, the readout apparatus comprising:

one of said wave reflecting means being partially transmissive and capable of transmitting a first wave which is a portion of one of said counter-propagating waves impinging thereon, and transmitting a second wave which is a portion of the other one of said counter-propagating waves also impinging thereon;

first optical means for receiving said first and second waves, and optically combining said first and second waves for establishing a first light beam exiting from a first surface of said first optical means, said first light beam exiting from said first optical means having a first beam size and having electromagnetic characteristics representative of a first selected function of said two counter-propagating waves;

first concave mirror means having a selected radius of curvature and focal point, said first concave mirror (i) being positioned to receive said first light beam impinging thereon, and (ii) causing said first light beam to be redirected along a first light path through said first optical means and exiting therefrom reduced in beam size relative to said first beam size at a first selected point outside said first optical means.

2. The readout out apparatus of claim 1 wherein:

said first optical means further includes means for optically combining said first and second waves for establishing a second light beam exiting from a second surface of said first optical means, said second light beam exiting from said second surface having a second beam size and having electromagnetic characteristics representative of a second selected function of said counter-propagating waves; and said readout apparatus further comprising a second concave mirror means having a selected radius of curvature and focal point, said second concave mirror (i) being positioned to receive said second light beam impinging thereon, (ii) and causing said second light beam to be redirected along a second light path back through said first optical means and exiting therefrom reduced in beam size relative to said second beam size at a second selected point outside said first optical means.

3. The apparatus of claim 1 wherein said first optical means is a prismatic structure having a plurality of exterior surfaces.

4. The apparatus of claim 1 where said first optical means is a solid structure comprising at least a pair of prisms in which said prisms are joined together at a first interface and including a beam splitter at said interface, and each of said prisms includes an exterior surface having a wave reflecting means thereat for reflecting waves impinging thereon back into said solid structure.

5. The apparatus of claim 1 wherein said readout apparatus comprises a first detector positioned at said first selected point for providing an output signal indicative of the intensity of said first light beam.

6. The apparatus of claim 2 wherein said readout apparatus comprises first and second photodetectors positioned at said first and second selected points, for providing an output signal indicative of the intensity of said first and second light beams impinging thereon respectively.

7. The apparatus of claim 1 wherein said first selected point is substantially near the focal point of said first concave mirror.

* * * * *

UNITED STATES PATENT AND TRADEMARK OFFICE
CERTIFICATE OF CORRECTION

PATENT NO. : 5,059,029

DATED : October 22, 1991

INVENTOR(S) : JAMES W. BERGSTROM

It is certified that error appears in the above-identified patent and that said Letters Patent is hereby corrected as shown below:

Column 6,

Claim 1, Line 19, delete "with" and insert --which--.

Signed and Sealed this

Ninth Day of March, 1993

Attest:

STEPHEN G. KUNIN

*Attesting Officer*  *Acting Commissioner of Patents and Trademarks*